United States Patent
Wood et al.

(10) Patent No.: US 9,501,701 B2
(45) Date of Patent: Nov. 22, 2016

(54) SYSTEMS AND METHODS FOR DETECTING AND TRACKING OBJECTS IN A VIDEO STREAM

(71) Applicant: The Charles Stark Draper Laboratory, Inc., Cambridge, MA (US)

(72) Inventors: Richard J. Wood, Derry, NH (US); John M. Irvine, Somerville, MA (US); David Reed, Boston, MA (US)

(73) Assignee: The Charles Stark Draper Technology, Inc., Cambridge, MA (US)

( * ) Notice: Subject to any disclaimer, the term of this patent is extended or adjusted under 35 U.S.C. 154(b) by 0 days.

(21) Appl. No.: 14/611,788

(22) Filed: Feb. 2, 2015

(65) Prior Publication Data

US 2015/0220789 A1   Aug. 6, 2015

Related U.S. Application Data

(60) Provisional application No. 61/934,110, filed on Jan. 31, 2014.

(51) Int. Cl.
| | |
|---|---|
| *G06K 9/00* | (2006.01) |
| *G06K 9/46* | (2006.01) |
| *G06T 7/00* | (2006.01) |
| *G06T 7/20* | (2006.01) |

(52) U.S. Cl.
CPC ....... *G06K 9/00711* (2013.01); *G06K 9/00771* (2013.01); *G06K 9/46* (2013.01); *G06K 9/468* (2013.01); *G06T 7/0081* (2013.01); *G06T 7/2033* (2013.01); *G06K 2009/4666* (2013.01); *G06T 2207/20144* (2013.01)

(58) Field of Classification Search
None
See application file for complete search history.

(56) References Cited

U.S. PATENT DOCUMENTS

| | | | | |
|---|---|---|---|---|
| 2004/0076337 | A1* | 4/2004 | Nishida | G06K 9/38 382/274 |
| 2007/0273765 | A1* | 11/2007 | Wang | G06K 9/00771 348/152 |
| 2010/0128930 | A1* | 5/2010 | Liu | G06K 9/48 382/103 |
| 2015/0220789 | A1* | 8/2015 | Wood | G06T 7/0081 382/103 |

FOREIGN PATENT DOCUMENTS

EP     0 666 545     8/1995

OTHER PUBLICATIONS

Bedagkar-Gala, Apurva et al., "Joint Modeling of Algorithm Behavior and Image Quality for Algorithm Performance Prediction", Quantitative Imaging Laboratory Computer Science Department, University of Houston, 2010, 11 pages.

(Continued)

*Primary Examiner* — Tahmina Ansari
(74) *Attorney, Agent, or Firm* — Paul S. Hunter; Foley & Lardner LLP (57) ABSTRACT

This disclosure provides systems, methods, and apparatus for analyzing a video are disclosed. An input video signal can be received and a quality metric associated with the input video signal can be determined. A parameter to be used in a first object tracking process can be selected, based in part on the quality metric associated with the input video signal. A background model can be extracted from the input video signal based on an online median estimate of the intensity values of the pixels in the image frames. The online median estimate can be calculated using a quantile function.

22 Claims, 4 Drawing Sheets

(56) References Cited

OTHER PUBLICATIONS

Calderara et al., "Reliable Background Suppression for Complex Scenes", VSSN 2006 Proceedings of the 4th ACM international workshop on Video surveillance and sensor networks pp. 211-214, 2006.

Cavallaro et al., "Object-based video: extraction tools, evaluation metrics, and applications." Visual Communications and Image Processing 2003. International Society for Optics and Photonics, 2003, 8 pages.

Cucchiara et al., "Detecting Objects, Shadows and Ghosts in Video Streams by Exploiting Color and Motion Information", IEEE 11th International Conference on Image Analysis and Processing, Sep. 26-28, 2001, 6 pages.

Calderara, Simone, et al. Reliable background suppression for complex scenes, Proceedings of the 4th ACM International Workshop on Video Surveillance and Sensor Networks, VSSN '06, Jan. 1, 2006.

Cucchiara, Rita, et al., Detecting moving objects, ghosts, and shadows in video streams, ISSS Transactions on Pattern Analysis and Machine Intelligence, vol. 25, No. 10, IEEE Computer Society, Oct. 1, 2003.

Irvine, John M., et al., Image Quality and Performance Modeling for Automated Target Detection, Proceedings of SPIE, vol. 7335, Apr. 28, 2009.

Yunchu, Zhang, et al., Moving Object Detection in the Low Illumination Night Scene, IET International Conference on Information Science and Control Engineering 2012, Dec. 7, 2012.

* cited by examiner

SYSTEMS AND METHODS FOR DETECTING AND TRACKING OBJECTS IN A VIDEO STREAM

CROSS-REFERENCE TO RELATED APPLICATIONS

This application claims priority to U.S. Provisional Patent Application No. 61/934,110 filed on Jan. 31, 2014 and titled "ENHANCING EVENT DETECTION IN VIDEO USING ROBUST BACKGROUND AND QUALITY MODELING," which is herein incorporated by reference in its entirety.

BACKGROUND

Automated event recognition in video data has numerous practical applications for security and transportation. The ability to recognize events depends on detecting and tracking objects in a video stream. However, several factors such as lighting, weather, camera placement, scene complexity, and data compression can reduce the quality of the input video stream, thereby degrading the performance of automated tracking algorithms.

SUMMARY

The systems, methods, and devices of the disclosure each have several innovative aspects, no single one of which is solely responsible for the desirable attributes disclosed herein.

One innovative aspect of the subject matter described in this disclosure can be implemented in system for tracking foreground objects represented in an input video signal. The system includes an image quality assessment module configured to determine at least one image quality metric associated with the input video signal. The system includes a parameter selection module configured to select at least one parameter of a background modeling process based on the at least one image quality metric. The system includes a background identification module configured to update a background model for the input video signal using the at least one parameter of the background modeling process. The system includes an object detection module configured to identify at least one foreground object present in the input video signal, wherein the at least one object is not included in the background model. The system includes an object tracking module configured to track a position of the at least one object within frames of the input video signal.

In some implementations, the background model includes an estimate of a median pixel value for each pixel corresponding to a scene imaged in the input video signal. In some implementations, the background identification module is further configured to estimate the median pixel value for each pixel in the imaged scene using a quantile function. In some implementations, the background identification module is further configured to update the stored median value for each pixel at a frequency that is less than a frame rate of the input video signal. In some implementations, the parameter selection module is further configured to reduce a value of a parameter corresponding to a frequency with which the background identification module updates the stored median value for each pixel, based on an increase in the value of an image quality metric associated with a noise level of the input video signal.

In some implementations, the object detection module is further configured to calculate, for each pixel of a current image frame corresponding to a pixel in the imaged scene, a first difference between the pixel value and the stored median estimate for the pixel. The first difference can then be compared to a first threshold. The object detection module can identify the pixel as representing a portion of a background of the imaged scene, responsive to determining that the first difference does not exceed the first threshold. In some implementations, the object detection module is further configured to calculate, responsive to a determination that the first difference exceeds the first threshold value, a second difference between a value of a neighboring pixel and the stored median estimate for the neighboring pixel. The object detection module also can be configured to identify the pixel as representing an object not included within the background of the imaged scene, responsive to a determination that at least one of the first difference and the second difference exceeds the second threshold value. In some implementations, the parameter selection module is further configured to calculate the first threshold value by multiplying a coefficient parameter by a quantile range associated with each pixel of the current image frame, and to modify a value of at least one of the coefficient parameter and the quantile range used for calculating the first threshold value based on a change in the value of an image quality metric associated with a noise level or jitter level in the input video signal.

In some implementations, the image quality metric determined by the image quality assessment module can include at least one of a jitter metric and a local clutter metric. In some implementations, the system can include a video pre-processing module configured to select at least one image filtering process based on the at least one image quality metric. The video pre-processing module also can be configured to apply the at least one selected image filtering process to the input video signal prior to the background identification module updating the background based on the input video signal.

Another innovative aspect of the subject matter described in this disclosure can be implemented in system for detecting foreground objects represented in an input video signal. The system includes a background identification module configured to generate a background model for the input video signal. The background model includes an estimate of a median pixel value for each pixel corresponding to a scene imaged in the input video signal. For each pixel of a current image frame corresponding to the scene, the median pixel value is estimated by updating a stored median estimate for the pixel value based on the difference between a value of a corresponding pixel in a current image frame and the stored median estimate for the pixel. The system includes an object detection module configured to calculate, for each pixel of the current image frame corresponding to a pixel in the imaged scene, a first difference between the pixel value and the stored median estimate for the pixel. The object detection module compares the first difference to a first threshold and identifies the pixel as representing a portion of a background of the imaged scene, responsive to determining that the first difference does not exceed the first threshold.

In some implementations, the object detection module is further configured to calculate, responsive to a determination that the first difference exceeds the first threshold value, a second difference between a value of a neighboring pixel and the stored median estimate for the neighboring pixel. The object detection module also can be configured to identify the pixel as representing an object not included within the background of the imaged scene, responsive to a determination that at least one of the first difference and the second difference exceeds the second threshold value. In some implementations, the estimate of the median pixel value for each pixel in the image frame of the input video signal can be calculated using a quantile function. In some implementations, the background identification module is further configured to update the stored median value for each pixel at a frequency that is less than a frame rate of the input video signal. In some implementations, a sampling interval for updating the stored median value for each pixel is in the range of about 100 milliseconds to about 300 milliseconds.

Another innovative aspect of the subject matter described in this disclosure can be implemented in system for tracking foreground objects represented in an input video signal. The system includes an image quality assessment module configured to determine an image quality metric associated with the input video signal. The image quality metric includes at least one of a jitter metric and a local clutter metric. The system includes a parameter selection module configured to determine a set of parameters for the first tracking algorithm. The set of parameters includes at least one parameter selected based on the at least one image quality metric. The system includes an object detection module configured to identify at least one foreground object present in the input video signal. The system includes an object tracking module configured to track a position of the at least one object within frames of the input video signal, based on the first object tracking algorithm and the set of parameters.

In some implementations, the parameter selection module is further configured to predict a performance metric based on the set of parameters, the first object tracking algorithm, and the at least one image quality metric. In some implementations, the parameter selection module is further configured to update the at least one parameter of the first object tracking algorithm used by the object tracking module, based on a determination that the performance metric is below a threshold value. In some implementations, the parameter selection module is further configured to select a second object tracking algorithm to be used by the object tracking module, based on a determination that the performance metric is below a threshold value.

BRIEF DESCRIPTION OF THE DRAWINGS

Like reference numbers and designations in the various drawings indicate like elements.

DETAILED DESCRIPTION

Figure 1:
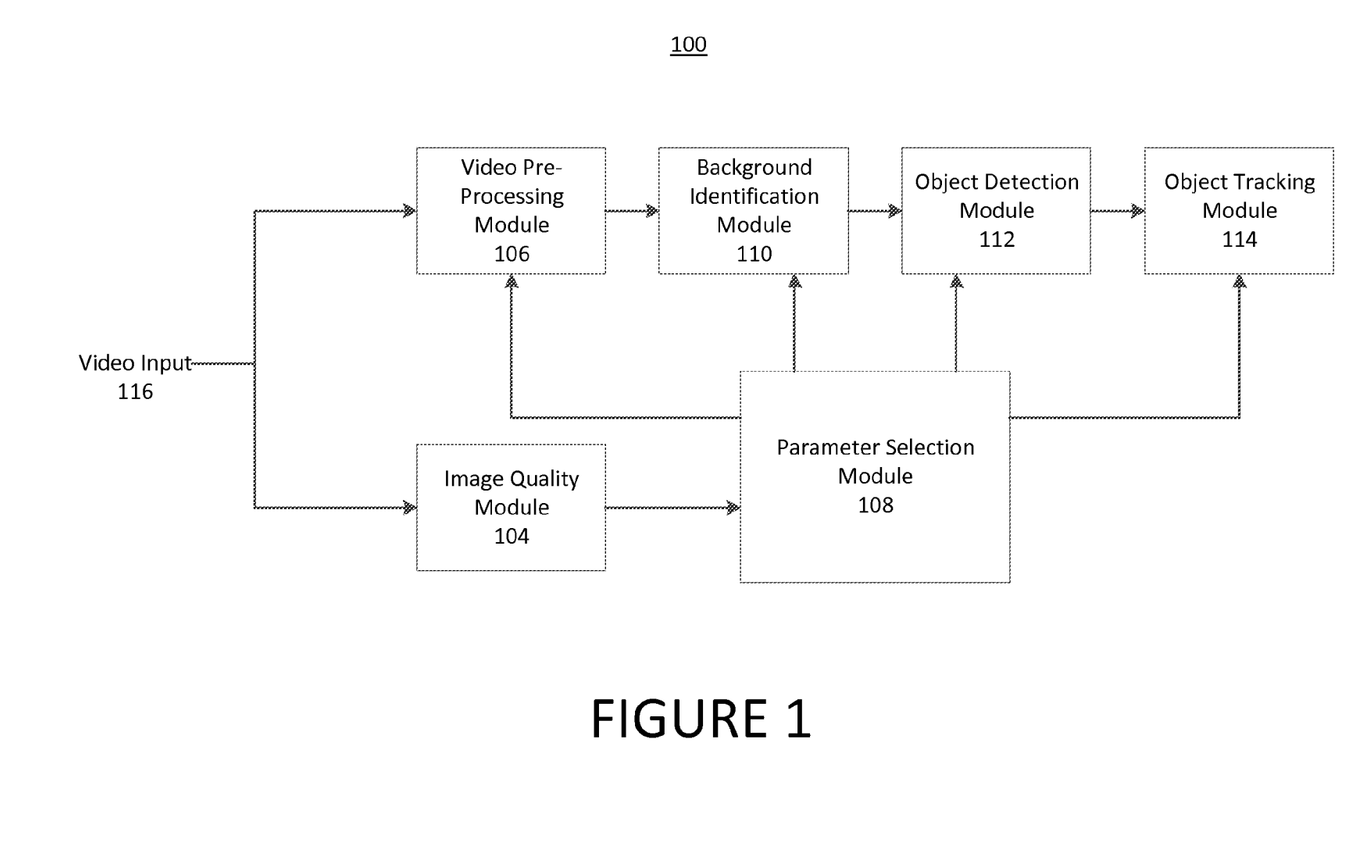
FIG. 1 shows a block diagram of a system for processing an input video signal, according to an illustrative implementation.

FIG. 1 shows a block diagram of a system 100 for processing an input video signal, according to an illustrative implementation. The system includes an image quality assessment module 104, a video pre-processing module 106, a parameter selection module 108, a background identification module 110, an object detection module 112, and an object tracking module 114. In broad overview, a video input signal 116 is received by the image quality assessment module 104 and the video pre-processing module 106. The parameter selection module 108 is configured to receive data from the image quality assessment module 104 and to output operating parameters to one or more of the video pre-processing module 106, the background identification module 110, the object detection module 112, and the object tracking module 114. The modules making up the system 100 may be implemented in hardware, software, or a combination thereof. For example, the modules may include one or more processors and memory devices storing computer executable instructions which, when executed by one or more processors, cause the one or more processors to perform the tasks discussed below. In some implementations, the computer executable instructions for all modules are executed by a single processor. In other implementations, the computer executable instructions may be distributed across multiple processors.

Referring again to FIG. 1, the system 100 receives a video input 116, which is delivered to both the image quality assessment module 104 and the video pre-processing module 106. The video input 116 can be video data representing a scene of interest. For example, the video input 116 can be video data captured from a location that is monitored by a surveillance camera. In some implementations, the video input 116 can be received directly from the camera used to generate the video data. In other implementations, the video input 116 may be stored in a computer memory device, and the system 100 can retrieve the video input 116 from the memory device. In some implementations, the video input 116 can be transmitted wirelessly to the image quality assessment module 104 and the video pre-processing module 106.

In some implementations, the video input 116 can be greyscale video data consisting of a stream of image frames in which each pixel is represented by a single intensity value. In other implementations, the video input 116 may be video data having color components. For example, each pixel may be represented by a red intensity value, a green intensity value, and a blue intensity value. Other color schemes also can be used for the video input 116. In some implementations, the video input 116 can be a digital video signal. For example, the video input 116 can be encoded in a digital video format such as Flash Video, MPEG-4, AVI, H.264, DivX, or any other digital video format. In other implementations, the video input 116 can be an analog video signal.

The video input 116 can represent a single viewpoint of a particular location over time. For example, a stationary camera can be used to capture the video input 116 from a fixed vantage point. Thus, the video input 116 may include image data corresponding to background imagery that remains substantially constant within the frames of the video input 116 over time. For example, image data representing trees and other vegetation, as well as permanent structures such as buildings, that are present at the location monitored by the camera can remain relatively unchanged within the video stream over long periods of time (e.g., on the order of hours or longer). The video input 116 may also include image data corresponding to foreground objects, such as people or moving vehicles that do not remain stationary within the frames of the video input 116 for long periods of time. To effectively track objects, the system 100 must first differentiate between pixels that correspond to the background and pixels that correspond to foreground objects.

The video input 116 is received by the image quality assessment module 104. The image quality assessment module 104 can be configured to determine information relating to the quality of the image frames of the video input 116. For example, the image quality assessment module 104 can be configured to determine a noise metric associated with the video input 116. The image quality assessment module 104 also can be configured to a determine a jitter metric associated with the video input 116. The jitter metric can represent a statistical description of the autocorrelation across sequential frames of the video input 116. The image quality assessment module 104 also can be configured to a determine a metric relating to the definition of edges of background and foreground objects within the video input 116. For example, the image quality assessment module 104 can determine a value associated with the sharpness or blurriness of edges in the video input 116.

In some implementations, the image quality assessment module 104 also can be configured to determine a metric associated with the local clutter present in the video input 116. Local clutter can relate to the spatial variation within the frames of the video input 116. In some implementations, the local clutter metric can be partially based on the size of foreground objects that are intended to be tracked by the system 100. For example, if the system 100 is primarily used to monitor vehicles, the local clutter metric can measure the spatial variation at the scale of objects that are approximately the size of vehicles within the scene. In some implementations, the image quality assessment module 104 can analyze the clutter of the video input 116 by portioning frames of the video input 116 into sub-regions that are approximately the size of the objects to be tracked. A mean pixel intensity value can be computed for each sub-region. The clutter metric can be calculated based on the variance of the mean intensity values across all of the sub-regions.

The image quality assessment module 104 also can be configured to determine an entropy metric of the video input 116. The entropy metric can relate to textures that are detected within the video input 116, and also may be dependent on the clutter of the video input 116. In some implementations, the image quality assessment module 104 also can be configured to determine data relating to environmental conditions at the location represented by the video input 116. For example, the image quality assessment module 104 can determine a time of day, visibility, or precipitation information associated with the scene represented by the video input 116.

The parameter selection module 108 can receive image quality metrics from the image quality assessment module 104. Based on the image quality metrics, the parameter selection module 108 can determine a set of algorithms and/or algorithm parameters to be used by one or more of the video pre-processing module 106, the background identification module 110, the object detection module 112, and the object tracking module 114.

In some implementations, several algorithms may be available for the video pre-processing module 106, the background identification module 110, the object detection module 112, and/or the object tracking module 114. Different algorithms, or different parameters for a single algorithm, may result in different levels of performance when used with input video signals having varying image qualities. Therefore, the parameter selection module 108 can use the image quality metrics received from the image quality assessment module 104 to select algorithms and parameters that have a greater likelihood of exhibiting higher performance for the particular characteristics of the video input 116. As the quality of the video input 116 changes, the parameter selection module 108 can update the parameters and algorithms for the other modules of the system 100, so that the system 100 performs well (i.e., detects and tracks objects within the video input 116 with improved accuracy) over time and across a wide range of image qualities for the video input 116. In some implementations, the algorithms used by the object tracking module 114 can be commercially available algorithms whose parameters are adjustable. Performance of the algorithms can be altered by adjusting parameters used by the algorithms. Thus, by selectively adjusting the parameters of commercially available tracking algorithms in response to changes in the quality of the video input 116, the performance of the tracking algorithms can be improved without changing the functionality of the algorithms themselves.

The video pre-processing module 106 can be configured to apply one or more filters to the video input 116. For example, the video pre-processing module 106 can help to filter noise from the video input signal 116, so that the video signal used by the background identification module 110, the object detection module 112, and the object tracking module 114 has a lower noise metric than the video input 116. Similarly, the video pre-processing module 106 can be used to enhance the edge sharpness of the video input 116. In some implementations, the parameter selection module 108 can select appropriate filters and other image processing techniques to be used by the image-preprocessing module 106 based on the image quality metrics received from the image quality assessment module 104.

The background identification module 110 can be configured to extract background information from the video signal received from the video pre-processing module 106. In some implementations, the background identification module 110 can model the background of the video input 116 based on an online median estimate of the intensity values of the pixels in the image frames. The collection of online median estimates for the pixels of the current image frame constitutes a model of the background for the current image frame.

Using an online estimate of the median intensity can provide a robust and stable background model, because a relatively large number of frames (i.e., more than half the sample size) may be required to corrupt the median values. Furthermore, the online median estimate is more computationally efficient than a true median calculation. For example, the online median estimate can be based on the previous median estimate and the current pixel intensity. Maintaining and continuously updating the online median estimate dispenses with the need to store pixel intensity values for every video frame (or at least a large number of video frames) indefinitely, as would be required for calculating true median values. In some implementations, the median estimate can be calculated as a quantile function. For example, the median estimate can be calculated based on the following function:

$$Q_{t+1} = Q_t + \epsilon(\text{sgn}(P_t - Q_t) + 2p - 1)$$

where Q is the quantile estimate being calculated, $P_t$ is the current pixel intensity value, p determines the quantile estimate to be calculated and is in the range of zero to one (i.e., the median value is 0.5), sgn is the sign function, and $\epsilon$ is the learning rate defined by the following equation:

$$\epsilon = 1.5 C/k^2$$

where k is the number of frames observed and C is the cumulative absolute deviation, given by the following equation:

$$C_{t+1} = C_t + |P_t - Q_t|.$$

When calculating the online median estimate according to the quantile function shown above, the quantity 2p−1 is zero. Therefore, if the current pixel value ($P_t$) differs from the previous online median estimate ($Q_t$), the estimate for the updated online median estimate ($Q_{t+1}$) is equal to the previous online median estimate ($Q_t$) plus or minus E. If the current pixel value ($P_t$) is the same as the previous online median estimate ($Q_t$), the updated online median estimate ($Q_{t+1}$) will not change from the previous online median estimate. The learning rate $\epsilon$ dictates how quickly the background model adjusts to changes in the background. Accordingly, it is based on the relative amount of variation detected over time for a pixel. The background model is updated faster for pixels that have a history of more variation than pixels that tend to have a more consistent value over time. The historical degree of variation is captured by the metric C. The cumulative absolute deviation C used to calculate the value of $\epsilon$ is initialized to zero at the beginning of the background modeling process. The cumulative absolute deviation is updated at the same rate as the online median estimate by adding the absolute value of the difference between the current pixel value and the online median estimate to the current value of the cumulative absolute deviation. The value of $\epsilon$ is also updated at the same frequency as the online median estimate and is calculated by multiplying a coefficient (1.5 in the example shown above) by the ratio of the cumulative absolute deviation and the square of the total number of frames sampled. In some implementations, a different value may be used for the coefficient in the calculation of $\epsilon$. In some implementations, the coefficient can be varied in response to changes in one or more image quality metrics associated with the input video.

In some implementations, the online median estimate can be updated at regular intervals. The update frequency can be lower than a frame rate of the video input 116. For example, the video input 116 may have a frame rate such as 30 Hz or 60 Hz, but the update rate for the median estimate may be significantly lower. In some implementations, the median estimate can be updated based on a sampling interval in the range of about 100 milliseconds to about 300 milliseconds. In some implementations, the sampling interval is 200 milliseconds. Updating the median estimate at a frequency lower than the frame rate of the video input 116 can help to improve computational efficiency of the background identification module 110. In some implementations, the sampling rate for updating the median estimate can be determined by the parameter selection module 108. For example, if the video input 116 is relatively noisy, the parameter selection module can select a lower sampling rate to be used by the background detection module 110, to compensate for the increased noise.

The object detection module 112 can be configured to extract foreground object information from the video signal. Foreground objects can be defined as objects that move within the scene and are not present in the background model. In some implementations, the foreground objects can be detected using quantile estimates similar to the median quantile estimate discussed above. For example, two pixel intensity thresholds can be defined and the intensity variation of each pixel in the video input 116 relative to the background model can be compared to the thresholds. A first threshold $T_{low}$, can filter out small intensity variations, while a second threshold $T_{high}$ can be used to detect regions where large intensity variations occur, which is indicative of a foreground object. The thresholds can be calculated based on quantile estimates according to the following equations:

$$T_{low} = \lambda(Q^{0.75} - Q^{0.25})$$

$$T_{high} = \lambda(Q^{0.99} - Q^{0.01})$$

where $\lambda$ is a fixed multiplier and $Q^p$ represents the quantile estimate for p. The value $\lambda$ is a unitless multiplier that controls the relationship between the quantiles and the high and low thresholds. Each quantile value can be calculated using the equation used for the median described above by changing the p value in that equation from 0.5 (representing a median quantile) to the quantile desired for the calculation (for example, 0.01, 0.25, 0.75, and 0.99). In some implementations, $\lambda$ has a value of about 7. A pixel is marked as a foreground pixel if its variation from the background model (i.e., the online median estimate for the pixel) exceeds the $T_{low}$ threshold and the pixel is spatially connected to at least one pixel whose variation from the background model exceeds the $T_{high}$ threshold image. A first pixel is spatially connected to a second pixel if the first and second pixels are directly adjacent or diagonal to one another within a frame of the video input 116. The variation from the background model for a pixel is calculated as the difference between the current pixel value ($P_t$) and the online median estimate for the pixel ($Q_t$). In some implementations, the quantile estimates can be updated for each pixel in every frame of the video input 116. In other implementations, the quantile estimates used for calculating the thresholds can be updated at a frequency lower than the frame rate. For example, the quantile estimates can be updated every other frame, or once ever n frames, where n is a positive integer. Generally, the quantile estimates used for calculating the thresholds can be updated more frequently than the background model for the video input 116.

Thus, for each pixel, several quantile estimates and other associated values are maintained to facilitate background modeling and foreground object detection. For example, in some implementations, the values shown in Table 1 below can be maintained for each pixel.

TABLE 1

| Values for Online Median Calculation | | | Values for $T_{Low}$ and $T_{High}$ Calculation | | | | | |
|---|---|---|---|---|---|---|---|---|
| $Q^{0.5}$ | $k_1$ | $C_1$ | $Q^{0.01}$ | $Q^{0.25}$ | $Q^{0.75}$ | $Q^{0.99}$ | $k_2$ | $C_2$ |

Where $Q^{0.5}$ is the online median estimate, $k_1$ is the number of frames observed for the online median estimate, $C_1$ is the cumulative absolute deviation for the online median estimate, $Q^{0.01}$ is the quantile estimate for the first percentile, $Q^{0.25}$ is the quantile estimate for the $25^{th}$ percentile, $Q^{0.75}$ is the quantile estimate for the $75^{th}$ percentile, $Q^{0.99}$ is the quantile estimate for the $99^{th}$ percentile, $k_2$ is the number of frames observed for the threshold calculations, and $C_2$ is the cumulative absolute deviation for the threshold calculations. It should be appreciated that the equations shown above are exemplary only. In some implementations, different quantile estimates may be used to calculate the high and low thresholds, or the online median estimate may be calculated according to a different equation. In addition, the equations used to calculate the thresholds can be changed based on the image quality metrics determined by the image quality assessment module 104. For example, if the image quality metrics indicate that the video input 116 has relatively low noise, then variations in pixel intensity relative to the background model are more likely to indicate a foreground object. As a result, the parameter selection module 108 can select parameters that result in lower values for the thresholds $T_{high}$ and $T_{low}$. For example, the thresholds can be set lower by reducing the value of λ or by narrowing the quantile ranges used to calculate each threshold value.

The object tracking module 114 can be configured to track foreground objects identified by the object detection module 112 as they move within the image frames of the video signal. In some implementations, the object tracking module 114 can be configured to use any of several different object tracking algorithms, each of which may use several parameters. For example, an object tracking algorithm may use parameters such as a motion sensitivity to control how sensitive the algorithm is to object movement, a number of frames used in a frame differencing process (sometimes referred to as "image-q-len"), a "skipped frame" parameter used to help detect slow moving objects, a "resurrection window" parameter that specifies an amount of time to track foreground objects that are temporarily obstructed by background components, and a parameter indicating whether to use an "advanced histogram" function that can adjust the degree of color matching used in tracking foreground objects. The value of advanced histogramming functions generally varies based on lighting conditions. In brighter lighting conditions, advanced histogram functions can be turned on to more effectively track objects whose paths cross or merge within the frames of the video input 116 by comparing the colors of the objects before and after their paths merge. In greyscale video, or video with low light or low color contrast, the benefits of such a function may not outweigh the computational costs of employing them. The value of advanced histogram functions can also depend on the level of local clutter in an input video, with videos having higher degrees of local clutter benefiting more from its use.

The parameter selection module 108 can be configured select the algorithms and the values of the parameters used by the object tracking module 114, based in part on the image quality metrics received from the image quality assessment module 104. For example, if the video input 116 has high noise or jitter metrics, the parameter selection module 108 can select a lower value for the motion sensitivity and a lower value for the number of frames used in frame differencing (i.e., the "image-q-len" parameter). If the video input 116 has a high entropy metric or if features of the background may obstruct foreground objects, the parameter selection module 108 can increase the value of the "resurrection window" parameter. If the video input 116 includes local clutter, the parameter selection module 108 can turn on the "advanced histogram" parameter and increase the "resurrection window" parameter. In some implementations, each object tracking algorithm can use a subset of all of the available adjustable parameters.

Figure 2A:
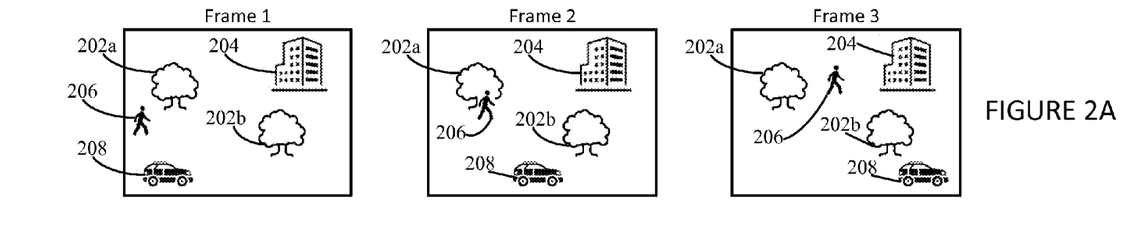
FIG. 2A shows three frames of an example input video signal, according to an illustrative implementation.
Figure 2B:
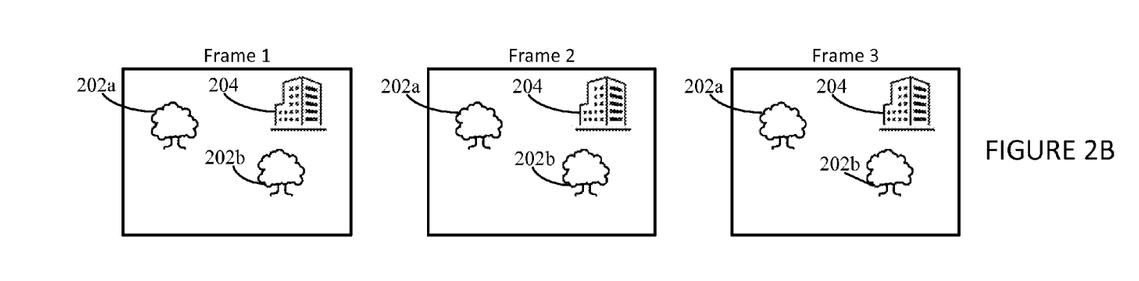
FIG. 2B shows an example background model extracted from the three frames of the example input video signal shown in FIG. 2A, according to an illustrative implementation.
Figure 2C:
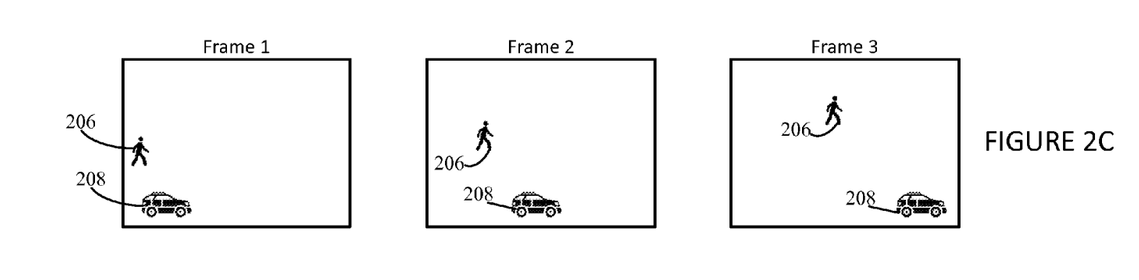
FIG. 2C shows foreground objects extracted from the three frames of the example input video signal shown in FIG. 2A, according to an illustrative implementation.

FIGS. 2A-2C illustrate how background imagery and foreground objects can be extracted from an input video signal. FIG. 2B shows an example background model extracted from the three frames of the example input video signal shown in FIG. 2A, according to an illustrative implementation. FIG. 2C shows foreground objects extracted from the three frames of the example input video signal shown in FIG. 2A, according to an illustrative implementation.

Referring again to FIG. 2A, three frames of an example input video signal are shown. In this example, Frame 1 occurs earlier in time than Frame 2, and Frame 2 occurs earlier in time than Frame 3. In some implementations, the frames shown in FIG. 2A may be sequential frames of the input video signal. In other implementations, the input video signal may include other frames between Frame 1 and Frame 2 or between Frame 2 and Frame 3.

The frames shown in FIG. 2A are captured by a stationary camera that is configured to monitor an area of interest. As shown, the area includes two trees 202a and 202b, a building 204, a person 206, and a vehicle 208. The trees 202a and 202b and the building 204 remain in substantially the same position in each frame, indicating that these objects are not moving over time. The person 206 moves up and to the right and the vehicle 208 moves to the right across the frames, indicating that these are moving objects. In some cases, it may be desirable to process the video signal represented by these frames using an automated algorithm to determine which portions of the scene represent background imagery and which portions represent foreground objects whose positions can be tracked over time.

FIG. 2B shows an example background model extracted from the three frames of the example input video signal shown in FIG. 2A. In some implementations, the background model can be determined by a module such as the background identification module 110 shown in FIG. 1, for example by using an estimate of the median pixel intensity values based on quantile functions as discussed above. The background model shown in FIG. 2B includes the stationary objects from the input video signal (i.e., the trees 202a and 202b and the building 204). Because these objects do not move within the video frames, the pixels representing these objects should have substantially the same median values over time. Determining an estimate of the median values of the pixels that represent these objects allows these objects to be identified as belonging to the background model.

FIG. 2C shows foreground objects extracted from the three frames of the example input video signal shown in FIG. 2A. The foreground objects include the moving objects that do not belong to the background model shown in FIG. 2B (i.e., the person 206 and the vehicle 208). In some implementations, the foreground objects can be determined based on the intensity variation threshold values discussed above in connection with FIG. 1. For example, because the person 206 and the vehicle 208 move within the video frames over time, the pixels that represent these objects in each frame will experience changes in intensity over time. The threshold calculations discussed above can be used to detect the pixel locations whose intensity varies significantly, in accordance with the variation that would be expected for pixels representing a moving foreground object. In some implementations, after the person 206 and the vehicle 208 have been identified as foreground objects, the object tracking module 114 can be used to track the positions of the person 206 and the vehicle 208 within the video frames over time. The person 206 and the vehicle 208 can be tracked within the video frames until they move outside the field of view of the camera.

Figure 3:
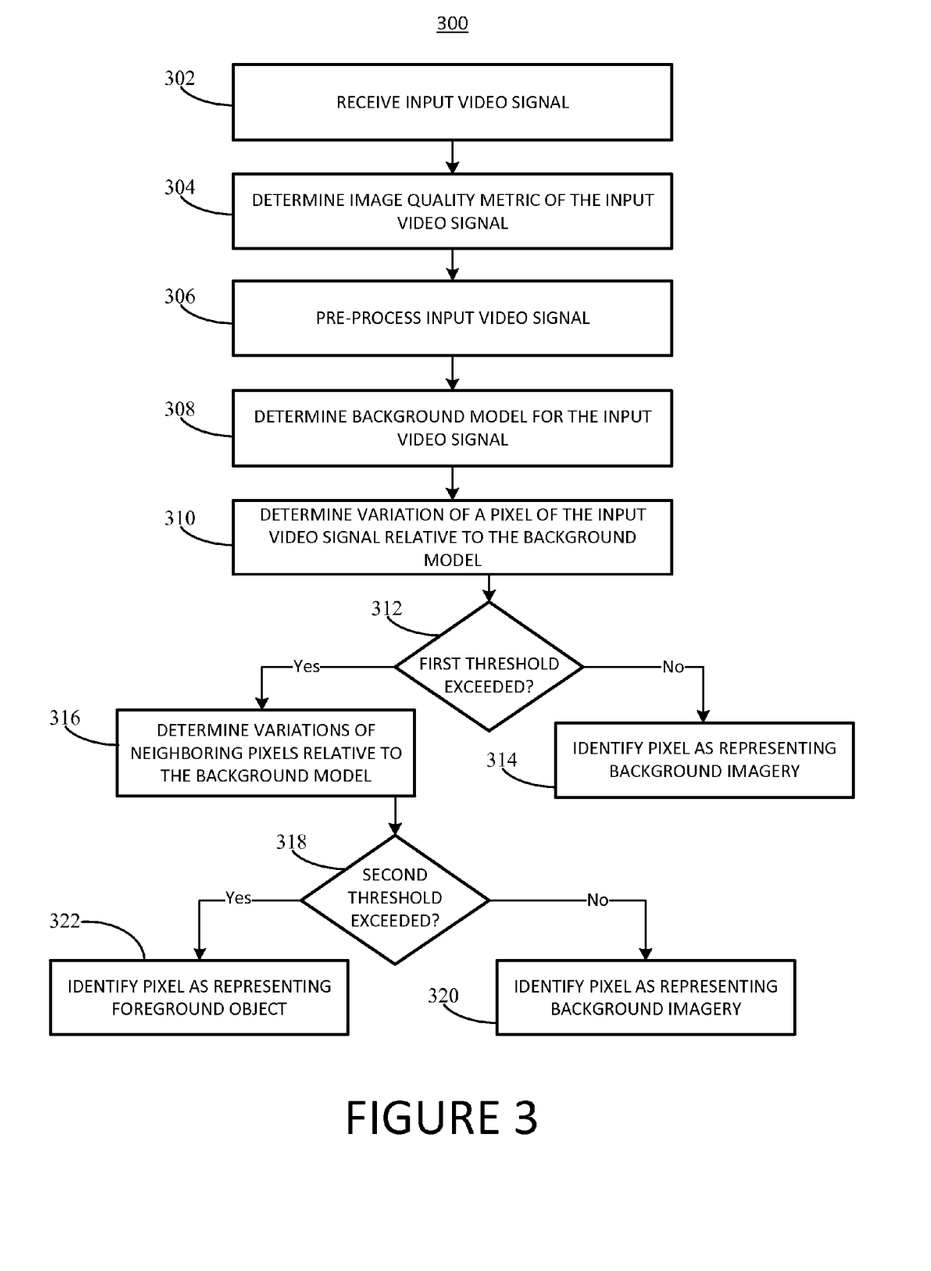
FIG. 3 shows a flow chart for a method of analyzing an input video signal, according to an illustrative implementation.

FIG. 3 shows a flow chart for a method 300 of analyzing an input video signal, according to an illustrative implementation. The method includes receiving an input video signal (stage 302), determining an image quality metric of the input video signal (stage 304), pre-processing the input video signal (stage 306), and determining a background model for the input video signal (stage 308). A variation of a pixel value of the input video signal with respect to the background model is determined (stage 310), and is compared to a first threshold value (stage 312). If the first threshold value is not exceeded, the pixel is identified as representing background imagery (stage 314). If the first threshold value is exceeded, the variation for its neighboring pixels with respect to the background model is determined (stage 316). The variation of the pixel and its neighboring pixels with respect to the background is compared to a second threshold value (stage 318). If the second threshold value is not exceeded, the pixel is identified as representing background imagery (stage 320). If the second threshold value is exceeded, the pixel is identified as belonging to a foreground object (stage 322).

Referring again to FIG. 3, the method 300 includes receiving an input video signal (stage 302). In some implementations, the input video signal can be received by a module such as the image quality assessment module 104 shown in FIG. 1. The video signal can be video data representing a scene of interest. For example, the video signal can be video data captured from a location that is monitored by a surveillance camera, such as a stationary camera that generates video data from a fixed vantage point. Thus, the video signal may include background imagery that remains substantially constant within the frames of the input video input over time, as well as foreground objects that move within the frames of the input video signal.

An image quality metric associated with the input video signal can be determined (stage 304). In some implementations, the image quality metric can be determined by a module such as the image quality assessment module 104 shown in FIG. 1. The image quality metric can be a noise metric, a jitter metric representing the autocorrelation across sequential video frames, a metric relating to the sharpness of edges of background and foreground objects within the input video signal, a metric associated with the local clutter present in the video signal, an entropy metric of the input video signal, or any other metric associated with the quality of the input video signal. In some implementations, the image quality metric can relate to environmental conditions in the area represented in the input video signal, such as the precipitation, time of day, temperature, or visibility. In some implementations any or all of the metrics discussed above may be determined for the video input signal.

The method 300 includes pre-processing the input video signal (stage 306). In some implementations, pre-processing the input video signal can include selecting and applying one or more filters to the input video signal. The filter or filters can be selected based in part on the image quality metric associated with the input video signal. For example, if the image quality metric indicates that there is a high degree of noise in the input video signal, a filter can be applied to the input video signal to reduce or eliminate the noise. In some implementations, the image quality metric can indicate the presence of particular types of noise, and one or more filters can be applied to the input video signal to address the particular types and levels of noise present in the input video signal. For example, the image quality metric can indicate that the input video signal includes a relatively high degree of shot noise or Gaussian noise, and appropriate filters can be selected to address these types of noise based on the image quality metric.

The method 300 includes determining a background model for the input video signal (stage 308). In some implementations, the background model can be updated based on either or both of the image quality metric and the online median estimate of intensity for each pixel in the input video signal. For example, the background model calculation process can be updated to take into account a quality metric representing the environmental conditions in the area represented by the input video signal. Thus, the background may be more accurately modeled based on a determination that there is low light in the scene (i.e., it is evening or overcast) or a determination that there is heavy precipitation. For video of scenes near, for example, roadways, rail crossings, airports, or industrial facilities, levels of camera jitter may vary over the course of the day depending on whether traffic is heavy, a train passes through the crossing, or the airport or facility is in active use. To background modeling process can be adjusted based on changes in the level of jitter in the video to take into account these variations to provide a more accurate background model. For example, if higher levels of jitter are detected, the sampling rates for the background model update process and/or the variation threshold update process can be reduced. If lower levels of jitter are detected, the sampling rates can be increased.

As described above, in some implementations, an online median estimate can be used to determine the background model for the input video signal. The online median estimate can be determined based on a quantile function as discussed above in connection with FIG. 1. In some implementations, the online median estimate can be determined based on a subset of the total frames of the input video signal. For example, frames can be sampled for use in the quantile calculation at a frequency that is lower than the frame rate of the input video signal, to improve computational efficiency. In some implementations, the rate at which the background model is updated (i.e., the sampling rate) can be adjusted based on the image quality metric. For example, sampling frames at a rate lower than the frame rate of the input video signal can serve as a low pass filtering technique by ignoring high frequency intensity variations (e.g., variations that change between consecutive image frames due to noise or jitter). In some implementations, the value of the coefficient used in the calculation of the $\epsilon$ value for the online median estimate also can be adjusted based on the image quality metric.

The method 300 includes determining a variation of a pixel value of the input video signal with respect to the background model (stage 310). In some implementations, the variation with respect to the background model can be determined using a quantile function as discussed above in connection with FIG. 1. The variation can be calculated as a single greyscale value or as the Euclidean distance between a multicolor vector (e.g., a vector having red, green, and blue components) corresponding to the background model and a vector for the corresponding pixel in the current image frame. The variation of the pixel with respect to the background model is then compared to a first threshold value (stage 312). For example, the first threshold value can be calculated based on the difference between the 75% and 25% quantile estimates for the pixel intensity (or intensity vector) over a set of image frames. In other implementations, different values may be used for the first threshold value.

If the first threshold value is not exceeded, the pixel can be identified as representing background imagery (stage 314). Thus, the first threshold can be used to filter out pixels having relatively small intensity variations with respect to the background model. For example, small intensity variations indicate that the appearance of the pixel is not rapidly changing over time, and therefore the pixel has a higher likelihood of representing a stationary object. Accordingly, pixels whose intensity variations fall below the first threshold value can be identified as representing background imagery without further processing.

If the variation of the pixel with respect to the background model exceeds the first threshold value, the method includes determining variations for its neighboring pixels with respect to the background model (stage 316). Neighboring pixels are pixels that are directly adjacent or diagonal to one another. Thus, each pixel (except for the edge pixels) has eight neighboring pixels. The variations of the neighboring pixels with respect to the background also can be determined as the Euclidean distance between vectors corresponding to the neighboring pixels of the background model and the vectors for the respective neighboring pixels in the current image frame. The second threshold can be set higher than the first threshold. For example, in some implementations the second threshold value can be based on the difference between the 1% and 99% quantile estimates for the pixel. When the variation of the pixel or one its neighboring pixels with respect to the background model exceeds the second threshold, it is likely that the pixel represents a foreground object that does not belong to the background model. Therefore, if the second threshold value is not exceeded by the intensity variation of the pixel or one of its neighboring pixels, the pixel is identified as representing background imagery (stage 320). If the second threshold value is exceeded by the pixel or a neighboring pixel, the pixel is identified as belonging to a foreground object (stage 322). In some implementations, stages 310-322 of the method 300 can be repeated for each pixel in the input video signal. These stages may be repeated for each pixel in every frame, or may be repeated at a frequency lower than the frame rate of the input video signal.

Figure 4:
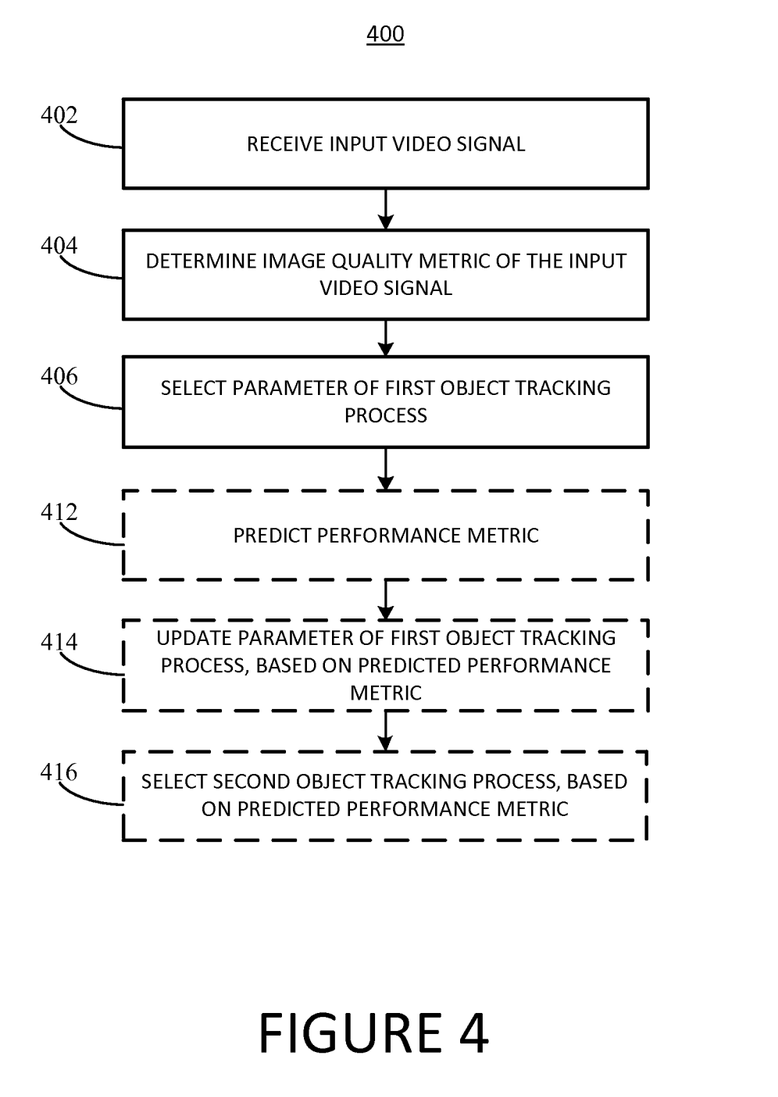
FIG. 4 shows a flow chart for a method of tracking a foreground object present in an input video signal, according to an illustrative implementation.

FIG. 4 shows a flow chart for a method 400 of tracking a foreground object present in an input video signal, according to an illustrative implementation. The method 400 includes receiving an input video signal (stage 402), determining an image quality metric associated with the input video signal (stage 404), and selecting a parameter of a first object tracking process based on the image quality metric (stage 406). In some implementations, the method 400 also includes selecting an image filtering process (stage 408) and applying the image filtering process to the input video signal (stage 410). In some implementations, the method 400 also includes predicting a performance metric of the first object tracking process (stage 412), updating a parameter of the first object tracking process based on the predicted performance metric (stage 414), or selecting a second object tracking process based on the predicted performance metric (stage 416).

Referring again to FIG. 4, the method 400 includes receiving an input video signal (stage 402). In some implementations, the input video signal can be received by a module such as the image quality assessment module 104 shown in FIG. 1. The video signal can be video data representing a scene of interest. For example, the video signal can be video data captured from a location that is monitored by a surveillance camera, such as a stationary camera that generates video data from a fixed vantage point. Thus, the video signal may include background imagery that remains substantially constant within the frames of the input video signal over time, as well as foreground objects that move within the frames of the input video signal.

An image quality metric associated with the input video signal can be determined (stage 404). In some implementations, the image quality metric can be determined by a module such as the image quality assessment module 104 shown in FIG. 1. The image quality metric can be a noise metric, a jitter metric representing the autocorrelation across sequential frames of, a metric relating to the edges of background and foreground objects within the input video signal, a metric associated with the local clutter present in the video signal, an entropy metric of the input video signal, or any other metric associated with the quality of the input video signal. In some implementations, the image quality metric can relate to environmental conditions in the area represented in the input video signal, such as the precipitation, time of day, temperature, or visibility. In some implementations any or all of the metrics discussed above may be determined for the video input signal.

The method includes selecting a parameter of a first object tracking process, based on the image quality metric (stage 406). In some implementations, an object tracking module can be configured to use a first object tracking process that uses several parameter values. For example, the first object tracking process may use parameters such as a motion sensitivity, a number of frames used in a frame differencing algorithm, a "skipped frame" parameter, a "resurrection window" parameter, and an "advanced histogram" parameter, as described above. Adjusting the parameters used by the object tracking process can impact the performance of the object tracking process. For example, in some implementations, the performance of a tracking process can be improved by selecting a lower value for the motion sensitivity if the input video signal has high noise or jitter metrics. High entropy metrics can be compensated for by increasing the value of the "resurrection window" parameter, which increases the amount of time that the algorithm tracks a foreground object that is temporarily obstructed by a background feature. If the input video signal includes local clutter, performance of the tracking algorithm can be improved by turning on an "advanced histogram" function and increasing the "resurrection window" parameter.

In some implementations, the method 400 can include predicting a performance metric associated with the first object tracking process (stage 412). As discussed above, the performance of an object tracking process can be impacted by the parameter values used by the object tracking process as well as the characteristics of the input video signal. Therefore, the performance of a tracking process can be predicted based on the image quality metrics and the currently selected parameter values. In some implementations, the a module such as the parameter selection module 108 shown in FIG. 1 can predict the performance metric of the first object tracking process. The method 400 also can include updating a parameter of the first object tracking process based on the predicted performance metric (stage 414). In some implementations, it can be determined that better performance of the first object tracking process could be obtained by adjusting the value of one or more parameters of the first object tracking process, for example in response to a change in one of the image quality metrics. In some implementations, a parameter of the first object tracking process can be updated based on a determination that the predicted performance metric has fallen below a threshold value. In other implementations, a parameter of the first object tracking process can be updated periodically at regular intervals in response to changes in the image quality metrics.

In some implementations, the method 400 can include selecting a second object tracking process based on the predicted performance metric (stage 416). For example, it can be determined that better object tracking performance can be obtained by selecting a different object tracking process, rather than by updating a parameter of the currently selected object tracking process. Again, a second object tracking process can be selected based on a determination that the predicted performance metric has fallen below a threshold value. In other implementations, a second object tracking process can be selected in response to changes in the image quality metrics.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A system for tracking foreground objects represented in an input video signal, the system comprising: an image quality assessment module configured to determine at least one image quality metric associated with the input video signal, wherein the image quality metric includes at least one of a jitter metric representing a statistical description of the autocorrelation across sequential frames of the input video signal, a metric relating to the sharpness of edges of background and foreground objects within the input video signal, a metric associated with the local clutter present in the video signal, and an entropy metric; a parameter selection module configured to select at least one parameter of a background modeling process based on the at least one image quality metric; a background identification module configured to update a background model for the input video signal using the at least one parameter of the background modeling process; an object detection module configured to identify at least one foreground object present in the input video signal, wherein the at least one object is not included in the background model; and an object tracking module configured to track a position of the at least one object within frames of the input video signal, wherein the background model includes an estimate of a median pixel value for each pixel corresponding to a scene imaged in the input video signal and is further configured to estimate the median pixel value for each pixel in the imaged scene using a quantile function.

2. The system of claim 1, wherein, for each pixel corresponding to the scene, the median pixel value is estimated by updating a stored median estimate for the pixel value based on the difference between a value of a corresponding pixel in a current image frame and the stored median estimate for the pixel.

3. The system of claim 1, wherein the background identification module is further configured to update the stored median value for each pixel at a frequency that is less than a frame rate of the input video signal.

4. The system of claim 1, wherein the parameter selection module is further configured to: reduce a value of a parameter corresponding to a frequency with which the background identification module updates the stored median value for each pixel, based on an increase in the value of an image quality metric associated with a noise level of the input video signal.

5. The system of claim 1, wherein the object detection module is further configured to: calculate, for each pixel of a current image frame corresponding to a pixel in the imaged scene, a first difference between the pixel value and the stored median estimate for the pixel; compare the first difference to a first threshold; and identify the pixel as representing a portion of a background of the imaged scene, responsive to determining that the first difference does not exceed the first threshold.

6. The system of claim 5, wherein the object detection module is further configured to:
calculate, responsive to a determination that the first difference exceeds the first threshold value, a second difference between a value of a neighboring pixel and the stored median estimate for the neighboring pixel; and
identify the pixel as representing an object not included within the background of the imaged scene, responsive to a determination that at least one of the first difference and the second difference exceeds a second threshold value.

7. The system of claim 6, wherein the parameter selection module is further configured to:
calculate the first threshold value by multiplying a coefficient parameter by a quantile range associated with each pixel of the current image frame; and
modify a value of at least one of the coefficient parameter and the quantile range used for calculating the first threshold value based on a change in the value of an image quality metric associated with a noise level or jitter level in the input video signal.

8. The system of claim 1, wherein the image quality metric determined by the image quality assessment module includes at least one of a jitter metric and a local clutter metric.

9. The system of claim 1, further comprising a video pre-processing module configured to:
select at least one image filtering process based on the at least one image quality metric; and apply the at least one selected image filtering process to the input video signal prior to the background identification module updating the background based on the input video signal.

10. A system for detecting foreground objects represented in an input video signal, the system comprising:
  a background identification module configured to generate a background model for the input video signal, wherein:
    the background model includes an estimate of a median pixel value for each pixel corresponding to a scene imaged in the input video signal, wherein the estimate of the median pixel value for each pixel in the image frame of the input video signal is calculated using a quantile function; and
    for each pixel of a current image frame corresponding to the scene, the median pixel value is estimated by updating a stored median estimate for the pixel value based on the difference between a value of a corresponding pixel in a current image frame and the stored median estimate for the pixel; and
  an object detection module configured to:
    calculate, for each pixel of the current image frame corresponding to an pixel in the imaged scene, a first difference between the pixel value and the stored median estimate for the pixel;
    compare the first difference to a first threshold; and
    identify the pixel as representing a portion of a background of the imaged scene, responsive to determining that the first difference does not exceed the first threshold.

11. The system of claim 10, wherein the object detection module is further configured to:
  calculate, responsive to a determination that the first difference exceeds the first threshold value, a second difference between a value of a neighboring pixel and the stored median estimate for the neighboring pixel; and
  identify the pixel as representing an object not included within the background of the imaged scene, responsive to a determination that at least one of the first difference and the second difference exceeds a second threshold value.

12. The system of claim 10, wherein the background identification module is further configured to update the stored median value for each pixel at a frequency that is less than a frame rate of the input video signal.

13. The system of claim 12, wherein a sampling interval for updating the stored median value for each pixel is in the range of about 100 milliseconds to about 300 milliseconds.

14. A system for tracking foreground objects represented in an input video signal, the system comprising:
  an image quality assessment module configured to determine an image quality metric associated with the input video signal, wherein the image quality metric includes at least one of a jitter metric representing a statistical description of the autocorrelation across sequential frames of the input video signal and a local clutter metric;
  a parameter selection module configured to determine a set of parameters for a first tracking algorithm, the set of parameters including at least one parameter selected based on the at least one image quality metric;
  an object detection module configured to identify at least one foreground object present in the input video signal; and
  an object tracking module configured to track a position of the at least one object within frames of the input video signal, based on the first object tracking algorithm and the set of parameters.

15. The system of claim 14, wherein the parameter selection module is further configured to predict a performance metric based on the set of parameters, the first object tracking algorithm, and the at least one image quality metric.

16. The system of claim 15, wherein the parameter selection module is further configured to update the at least one parameter of the first object tracking algorithm used by the object tracking module, based on a determination that the performance metric is below a threshold value.

17. The system of claim 15, wherein the parameter selection module is further configured to select a second object tracking algorithm to be used by the object tracking module, based on a determination that the performance metric is below a threshold value.

18. The system of claim 1, wherein the quantile function used to estimate the median pixel value for each pixel in the imaged scene is:

$$Q_{t+1}=Q_t+\epsilon(\text{sgn}(P_t-Q_t))$$

wherein:
Q is the quantile estimate being calculated;
$P_t$ is a current pixel intensity value;
sgn is a sign function;
and $\epsilon$ is a learning rate.

19. The system of claim 18, wherein the learning rate $\epsilon$ is defined as:

$$\epsilon=1.5C/k^2$$

wherein k is a number of frames observed and C is a cumulative absolute deviation defined as:

$$C_{t+1}=C_t+|P_t-Q_t|.$$

20. The system of claim 10, wherein the quantile function used to estimate the median pixel value for each pixel in the imaged scene is:

$$Q_{t+1}=Q_t+\epsilon(\text{sgn}(P_t-Q_t))$$

wherein:
Q is the quantile estimate being calculated;
$P_t$ is a current pixel intensity value;
sgn is a sign function; and
$\epsilon$ is a learning rate.

21. The system of claim 20, wherein the learning rate E is defined as:

$$\epsilon=1.5C/k^2$$

wherein k is a number of frames observed and C is a cumulative absolute deviation defined as:

$$C_{t+1}=C_t+|P_t-Q_t|.$$

22. The system of claim 14, wherein the at least one parameter includes at least one of motion sensitivity, a number of frames used in a frame differencing process, a skipped frame parameter, a resurrection window parameter, and an advanced histogram parameter.

* * * * *